US009697112B2

(12) United States Patent
Perez et al.

(10) Patent No.: US 9,697,112 B2
(45) Date of Patent: *Jul. 4, 2017

(54) PARTIAL RELEASE MANAGEMENT (71) Applicant: International Business Machines Corporation, Armonk, NY (US)

(72) Inventors: Miguel A. Perez, Miami, FL (US); David C. Reed, Tucson, AZ (US); Max D. Smith, Tucson, AZ (US); Carrie B. Wood, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,242

(22) Filed: Dec. 2, 2016

(65) Prior Publication Data

US 2017/0075803 A1    Mar. 16, 2017

Related U.S. Application Data

(63) Continuation of application No. 15/219,531, filed on Jul. 26, 2016, now Pat. No. 9,588,710, which is a
(Continued)

(51) Int. Cl.
*G06F 17/30*    (2006.01)
*G06F 12/02*    (2006.01)
(Continued)

(52) U.S. Cl.
CPC .......... *G06F 12/023* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 8,407,445 B1    3/2013 Pathak et al.
9,026,716 B2    5/2015 Kang et al.
(Continued)

FOREIGN PATENT DOCUMENTS

CN    102591789 A    7/2012

OTHER PUBLICATIONS

List of IBM Patents or Patent Applications Treated as Related, dated Nov. 30, 2016, pp. 1-2.
(Continued)

*Primary Examiner* — Anh Tai Tran
(74) *Attorney, Agent, or Firm* — Laura E. Gisler (57) ABSTRACT

A method, system, and computer program product for managing a partial release for a unit of storage space in a storage facility is disclosed. The method, system, and computer program product include establishing an invocation threshold for initiating a partial release for a unit of storage space. The method, system, and computer program product include establishing a preservation threshold for releasing a fractional amount of the unit of storage space. The method, system, and computer program product include initiating the partial release in response to reaching the invocation threshold. The method, system, and computer program product include releasing the fractional amount based on the preservation threshold.

1 Claim, 4 Drawing Sheets

Related U.S. Application Data continuation of application No. 14/305,438, filed on Jun. 16, 2014.

(51) Int. Cl.
*G06F 3/06* (2006.01)
*H04L 29/08* (2006.01)

(52) U.S. Cl.
CPC .......... *G06F 3/0644* (2013.01); *G06F 3/0653* (2013.01); *G06F 2212/154* (2013.01); *G06F 2212/263* (2013.01); *G06F 2212/69* (2013.01); *H04L 67/1097* (2013.01)

(56) References Cited

U.S. PATENT DOCUMENTS

| | | | | |
|---|---|---|---|---|
| 9,052,938 | B1* | 6/2015 | Bhide | G06F 9/45533 |
| 2009/0113124 | A1* | 4/2009 | Kataoka | G06F 9/5016 |
| | | | | 711/112 |
| 2013/0060991 | A1* | 3/2013 | Lee | G06F 12/0246 |
| | | | | 711/103 |
| 2014/0215176 | A1* | 7/2014 | Iga | G06F 11/008 |
| | | | | 711/170 |
| 2015/0067289 | A1 | 3/2015 | Sthanumoorthy | |
| 2015/0363432 | A1 | 12/2015 | Perez et al. | |
| 2016/0321007 | A1 | 11/2016 | Perez et al. | |

OTHER PUBLICATIONS

Perez et al., "Partial Release Management", U.S. Appl. No. 15/367,256, filed Dec. 2, 2016.

"Accelerated Examination Support Document", International Business Machines Corporation, dated Jul. 21, 2016, 20 pages.

"Accelerated Examination Support Document", International Business Machines Corporation, dated Nov. 22, 2016, 21 pages.

Dufrasne et al., "DS8000 Thin Provisioning", IBM, International Technical Support Organization, ibm.com/redbooks, Jul. 2014, © Copyright International Business Machines Corporation 2014, 122 pages.

* cited by examiner

PARTIAL RELEASE MANAGEMENT

TECHNICAL FIELD

This disclosure relates generally to computer systems and, more particularly, relates to managing a partial release for a unit of storage space in a storage system.

BACKGROUND

The amount of data that needs to be managed by enterprises is growing at an extremely high rate. Management of storage environments may need to be performed with as few errors as possible. As data needing to be managed increases, the need for management efficiency may increase.

SUMMARY

Aspects of the disclosure relate to data storage which provides partial release of unused space. An algorithm is described that can add a threshold to limit the use of the partial release. The algorithm can add a limit to hold a percentage reserve of the unused space from being released. In embodiments, the algorithm may add a retry at intervals for failed partial releases.

Aspects of the disclosure include a method, system, and computer program product for managing a partial release for a unit of storage space in a storage facility (i.e., storage system). An invocation threshold for initiating a partial release for a unit of storage space is established. A preservation threshold for releasing a fractional amount of the unit of storage space is established. In response to reaching the invocation threshold, the partial release is initiated. In response to initiating the partial release, the fractional amount (based on the preservation threshold) is released.

In embodiments, a partial release event indicator is established. The partial release event indicator can be configured to indicate reasons for events corresponding to initiated partial releases. The partial release event indicator may be recorded in a record. The record can be configured to collect reasons for events corresponding to initiated partial releases. In embodiments, a partial release retry temporal feature is established. The partial release retry temporal feature can be configured to retry the partial release at one of a predetermined interval or a specified time. Based on the partial release retry temporal feature, the partial release may be retried.

Aspects of the methodology may provide performance or efficiency benefits when managing unused space. The methodology uses thresholds to efficiently determine when and how partial release takes place. Aspects can allow for partial release to run at later times and may efficiently deter partial release from being called when little or no space is available to be released. The methodology can efficiently manage various space considerations (e.g., deter/prevent too much space from being released). Altogether, a storage system may be managed more efficiently.

DETAILED DESCRIPTION

Aspects of the disclosure relate to data storage which provides partial release of unused space. An algorithm is described that can add a threshold to limit the use of the partial release. The algorithm can add a limit to hold a percentage reserve of the unused space from being released. In embodiments, the algorithm may add a retry at intervals for failed partial releases.

In an operating system, a data set can be over allocated with unused direct access storage device (DASD) space. A Direct Access Device Storage Manager (DADSM) has a partial release function to free (all of) this unused space. Partial release may be invoked by a space management utility or by a close command. Invocation can be based on certain specifications or parameters for the data set.

Aspects of the disclosure may have positive impacts on being able to perform partial release and deallocating unused space when features (e.g., task input output table, volume table of contents, data source name) of the data set are in use. Partial release activities may be issued more efficiently by not being invoked as frequently on data sets that do not have unused space (e.g., positive impacts on the space management utility such as a hierarchical storage management utility). Aspects of the disclosure may deter fragmentation of the data set (e.g., resulting from a close operation being invoked repeatedly).

Consider the following example related to fragmentation. An initially allocation has 10 tracks of unused space in 1 extent. During close, after writing 1 track of data, 9 tracks get freed by partial release for the 1 extent. If the 'write and close' is repeated to add an additional track of data, then 2 extents exist. The extra extent is fragmenting the initial allocation because 2 tracks of used data can exist within the initial 1 extent of 10 unused tracks. Aspects of system managed storage (SMS) in conjunction with partial release, as described herein, can positively impact such example of fragmentation by freeing/releasing space in a more efficient manner (e.g., processing costs, fragmentation patterns).

Aspects of the disclosure include a method, system, and computer program product for managing a partial release for a unit of storage space in a storage facility (i.e., storage system). The method, system, and computer program product may work on a number of operating systems. An invocation threshold for initiating a partial release for a unit of storage space is established. A preservation threshold for releasing a fractional amount of the unit of storage space is established. In response to reaching the invocation threshold, the partial release is initiated. In response to initiating the partial release, the fractional amount (based on the preservation threshold) is released.

The invocation threshold can include a numerical value that represents an unused space measurement of a data set which is configured to invoke the partial release. The preservation threshold may include a numerical value that represents an unused space measurement of a data set which is configured to remain after completely executing the partial release. The fractional amount can include a numerical value that represents an unused space measurement of a data set which is configured to be removed in completely executing the partial release. In embodiments, addition of the preservation threshold with the fractional amount is equivalent to a total unused space measurement of a data set.

In embodiments, a partial release event indicator is established. The partial release event indicator can be configured to indicate reasons for events corresponding to initiated partial releases. The partial release event indicator may be recorded in a record. The record can be configured to collect reasons for events corresponding to initiated partial releases. According to particular embodiments, the recording may occur in response to both closing a data set for output and a failed partial release. The partial release event indicator can include a name for the data set or a failure reason code configured to identify at least one reason for the failed partial release. In embodiments, a partial release retry temporal feature is established. The partial release retry temporal feature can be configured to retry the partial release at one of a predetermined interval or a specified time. Based on the partial release retry temporal feature, the partial release may be retried.

Aspects of the disclosure include monitoring a data set for unused space, determining the data set includes unused space, initiating the partial release for at least a portion of the unused space, and releasing the portion of the unused space using the partial release. In embodiments, a failed partial release for a data set may be detected. In response to detecting the failed partial release, information for the data set can be collected in a data space. In embodiments, in response to closing a data set, a count of closures of the data set may be added to (e.g., adding one). In response to reaching a threshold count of closures of the data set, the partial release can be initiated. Aspects of the disclosure provide a methodology for managing a partial release that may provide performance or efficiency benefits when managing unused space.

Figure 1:
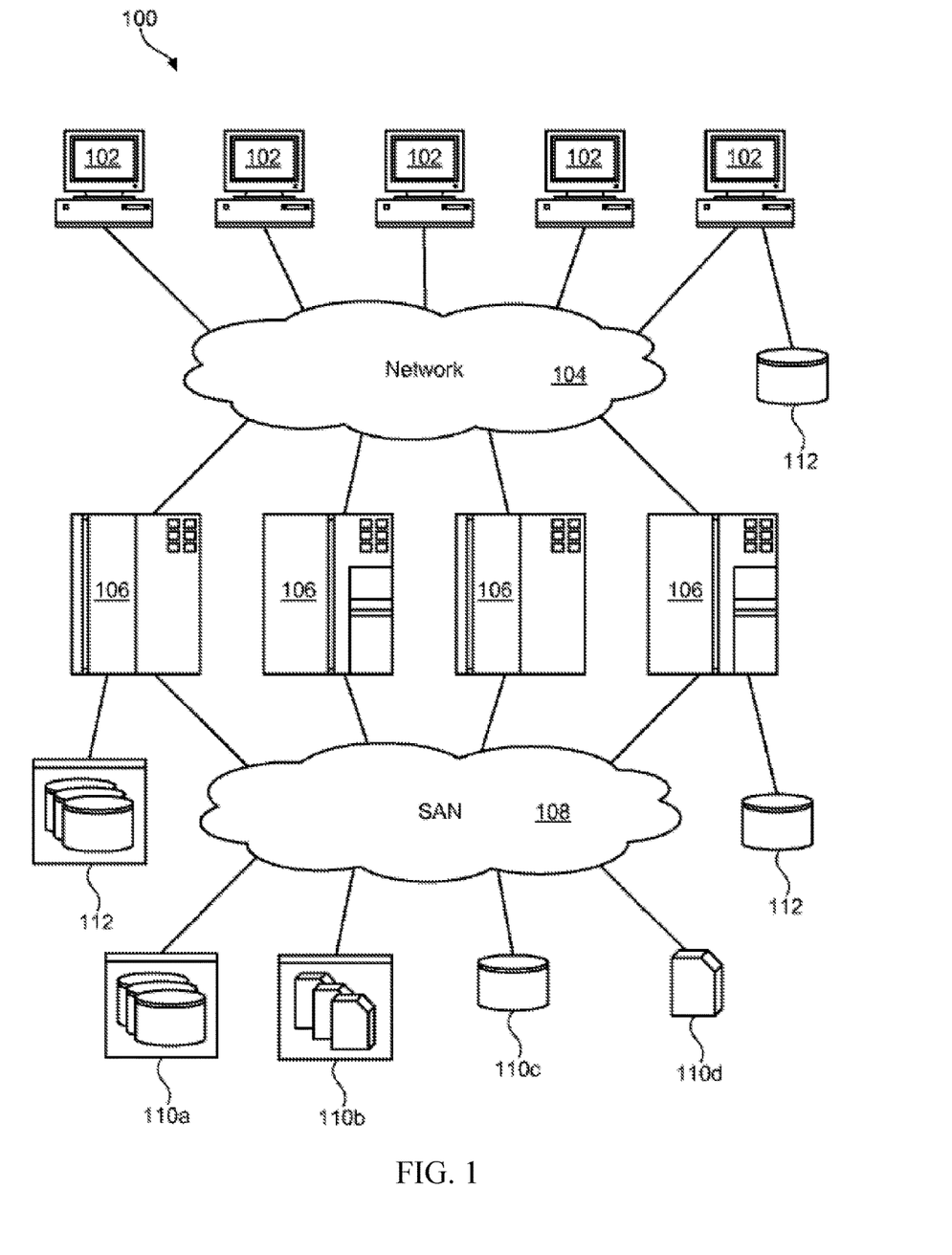
FIG. 1 illustrates an example network architecture according to embodiments.

FIG. 1 illustrates an example network architecture 100 according to embodiments. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN), a wide-area-network (WAN), the Internet, an intranet, or the like. In certain embodiments, the computers 102, 106 may include both client computers 102 and server computers 106 (also referred to herein as "host systems" 106 or alternatively as "host devices"). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from techniques of the disclosure.

The network architecture 100 may, in certain embodiments, include a storage network 108 behind the servers 106, such as a storage-area-network (SAN) or a LAN (e.g., when using network-attached storage). This network 108 may connect the servers 106 to one or more storage systems 110 (alternatively, remote systems or remote devices), such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from techniques according to the disclosure.

In embodiments, techniques of the disclosure may permit the storage pools of storage systems 110, 112 to efficiently free unused space. Therefore, the methodology provided may allow for partial release of unused space in relation to the example network architecture 100 illustrated by FIG. 1.

Figure 2:
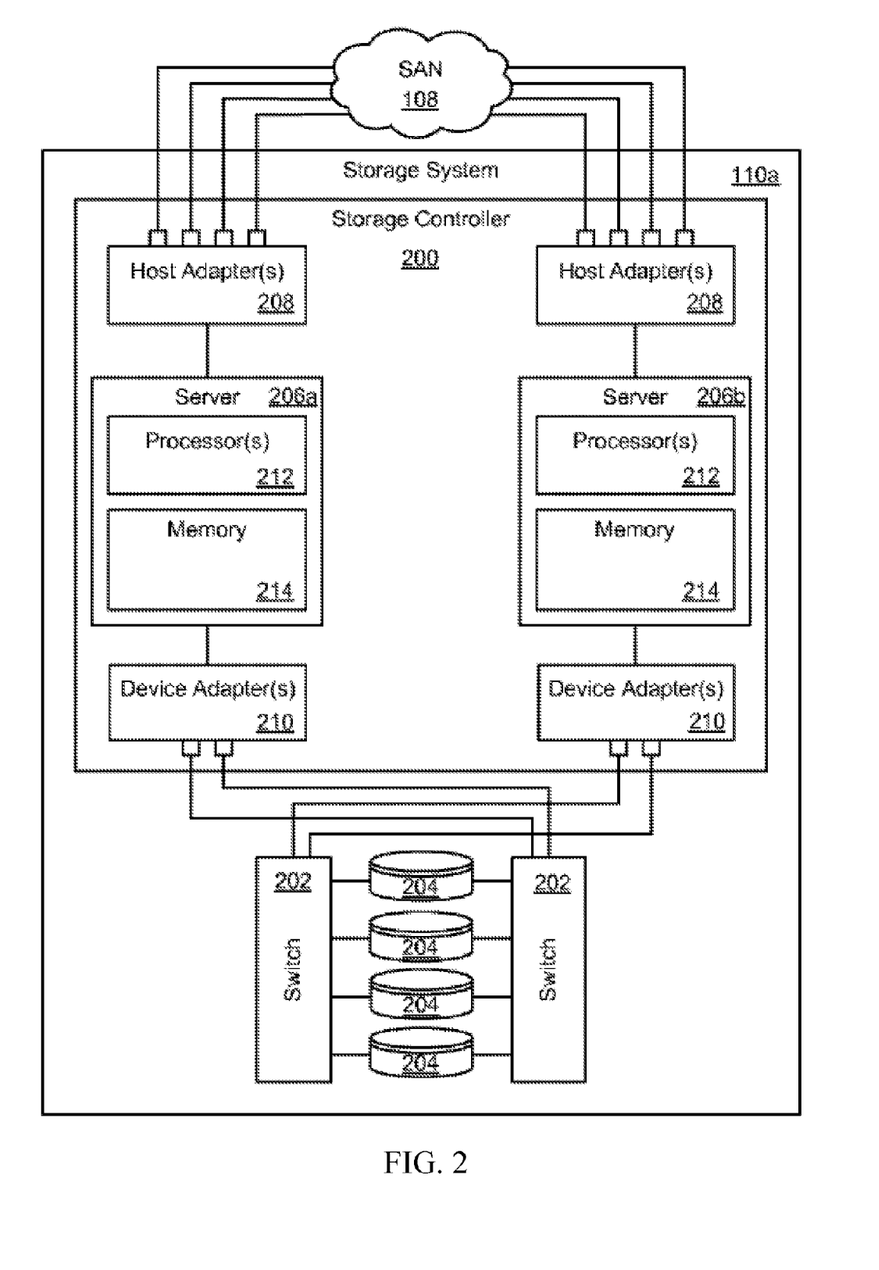
FIG. 2 illustrates an example storage system containing an array of storage devices according to embodiments.

FIG. 2 illustrates an example storage system 110a containing an array of storage devices 204 (e.g., hard-disk drives and/or solid-state drives) according to embodiments. The internal components of the storage system 110a are shown in accordance with the disclosure and may be used to manage such a storage system 110a. Nevertheless, techniques according to the disclosure may also be implemented within other storage systems 110, 112. As shown, the storage system 110a includes a storage controller 200, one or more switches 202, and one or more storage devices 204, such as hard-disk drives or solid-state drives (e.g., flash-memory-based drives). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

In embodiments, techniques of the disclosure may permit the storage devices 204 to free unused space. Therefore, the methodology provided may allow for partial release of unused space in relation to the example storage system 110*a* containing an array of storage devices 204 illustrated by FIG. 2.

Figure 3:
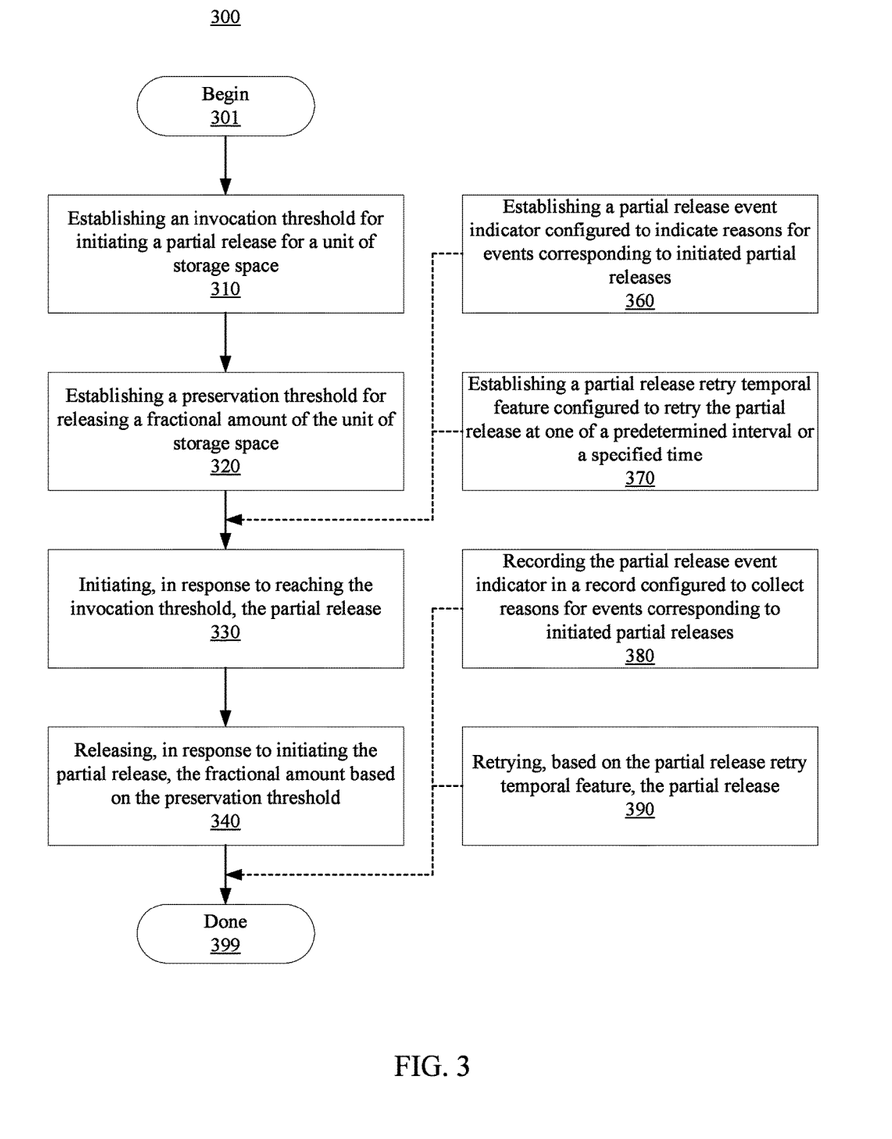
FIG. 3 is a flowchart illustrating a method for managing a partial release for a unit of storage space in a storage system according to embodiments.

FIG. 3 is a flowchart illustrating a method 300 for managing a partial release for a unit of storage space in a storage system according to embodiments. Aspects of method 300 may include monitoring a data set for unused space (e.g., using thresholds/comparators), determining the data set includes unused space (e.g., performing comparisons), initiating the partial release for at least a portion of the unused space, or releasing the portion of the unused space using the partial release. Method 300 may begin at block 301.

At block 310, an invocation threshold for initiating a partial release for a unit of storage space is established/created. The invocation threshold can include a numerical value that represents an unused space measurement of a data set which is configured to invoke the partial release. The invocation threshold may indicate when to start a partial release function/operation.

For example, a RLSE_START operator/command having parameter values of 0-100 may be included as the invocation threshold. 0-100 can represent the percentage of unused space to reach before partial release is to be invoked. For instance, a value of 80 can indicate that partial release will be invoked once the data set reaches 80% or more of unused space. A predetermined setting for this field could be user-defined or preset (e.g., 0, 25, 50).

At block 320, a preservation threshold for releasing a fractional amount of the unit of storage space is established/created. The preservation threshold may include a numerical value that represents an unused space measurement of a data set which is configured to remain after completely executing the partial release (e.g., indicate how much unused space is leftover afterward). The fractional amount can include a numerical value that represents an unused space measurement of a data set which is configured to be removed in completely executing the partial release (e.g., indicate how much unused space is released by the partial release function/operation). In embodiments, addition of the preservation threshold with the fractional amount is equivalent to a total unused space measurement of a data set.

For example, a RLSE_END operator/command having parameter values of 0-100 may be included as the preservation threshold. 0-100 can represent the percentage of unused space that is to remain after partial release has completed. For instance, a value of 20 may indicate that partial release will remove the unused space up to 20% of unused space. A predetermined setting for this field could be user-defined or preset (e.g., 0, 25, 50).

At block 330, in response to reaching the invocation threshold, the partial release is initiated/started/invoked. In embodiments, in response to closing a data set, a count of closures of the data set may be added to (e.g., adding one). In response to reaching a threshold count of closures of the data set, the partial release can be initiated. In embodiments, a partial release event indicator is established at block 360. The partial release event indicator can be configured to indicate reasons for events corresponding to initiated partial releases (e.g., a failed partial release event). The partial release event indicator may be recorded in a record at block 380. The record can be configured to collect reasons for events corresponding to initiated partial releases.

In embodiments, a failed partial release for a data set may be detected. In response to detecting the failed partial release, information for the data set can be collected in a data space. According to particular embodiments, the recording may occur in response to both closing a data set for output and a failed partial release. The partial release event indicator can include a name for the data set or a failure reason code configured to identify at least one reason for the failed partial release.

For example, when a data set is closed for output a record may be written. The record can include accounting information, performance data, system activity data, etc. Aspects may add to the record so that a partial release event/failure indicator RLSE_IND is available. The indicator can describe why the partial release failed (e.g., because an object/table/name was not obtained). In a specific example, the record includes an option to track data set close activity in to identify how often a data set is closed. For data sets that are closed often, the option may perform partial release in response to a portion of the closes (rather on every close) (e.g., predetermined number such as every fifth close, random number between every close and every twentieth close).

At block 340, in response to initiating the partial release, the fractional amount (based on the preservation threshold) is released/freed. In embodiments, a partial release retry temporal feature is established at block 370. The partial release retry temporal feature can be configured to retry the partial release at one of a predetermined interval or a specified time. Based on the partial release retry temporal feature, the partial release may be retried at block 390.

For example, RLSE_INTERVAL field may be added in a parameter library. Such field can be set from 1-24 and represents the interval in hours when the may be scanned in order to address partial release failures which may exist. A predetermined or user-defined value can be 1 hour. If the user does not save records or only retains records for a very short period of time, an alternate recording methodology may be used. The alternate recording method can hook into the code path that detects the partial release failures and save the data set information in a data space. For instance, if the value is 3, then 3 hours of previous record activity may be read every 3 hours. Such records may be used to identify new data sets with a RLSE_IND indicating a partial release failure. A partial release may be issued against such data sets. If partial release fails in response to initiation, then the data set name can be saved in an internal data space it can be tried again at the next 3 hour interval. In particular cases, an option may allow the user to specify a time for the partial release to take place. These illustrative examples show how aspects of the methodology can lower the degree of fragmentation related to (e.g., caused by) partial release. RLSE_IND and RLSE_INTERVAL can be utilized periodically so various data sets will not be regularly left with 100% unused space after a close.

Method 300 may conclude at block 399. Aspects of method 300 may provide performance or efficiency benefits when managing unused space. The methodology uses thresholds to efficiently determine when and how partial release takes place. Aspects can allow for partial release to run at later times and may efficiently deter partial release from being called when little or no space is available to be released. The methodology can efficiently manage various space considerations (e.g., deter/prevent too much space from being released). Altogether, a storage system may be managed more efficiently.

Figure 4:
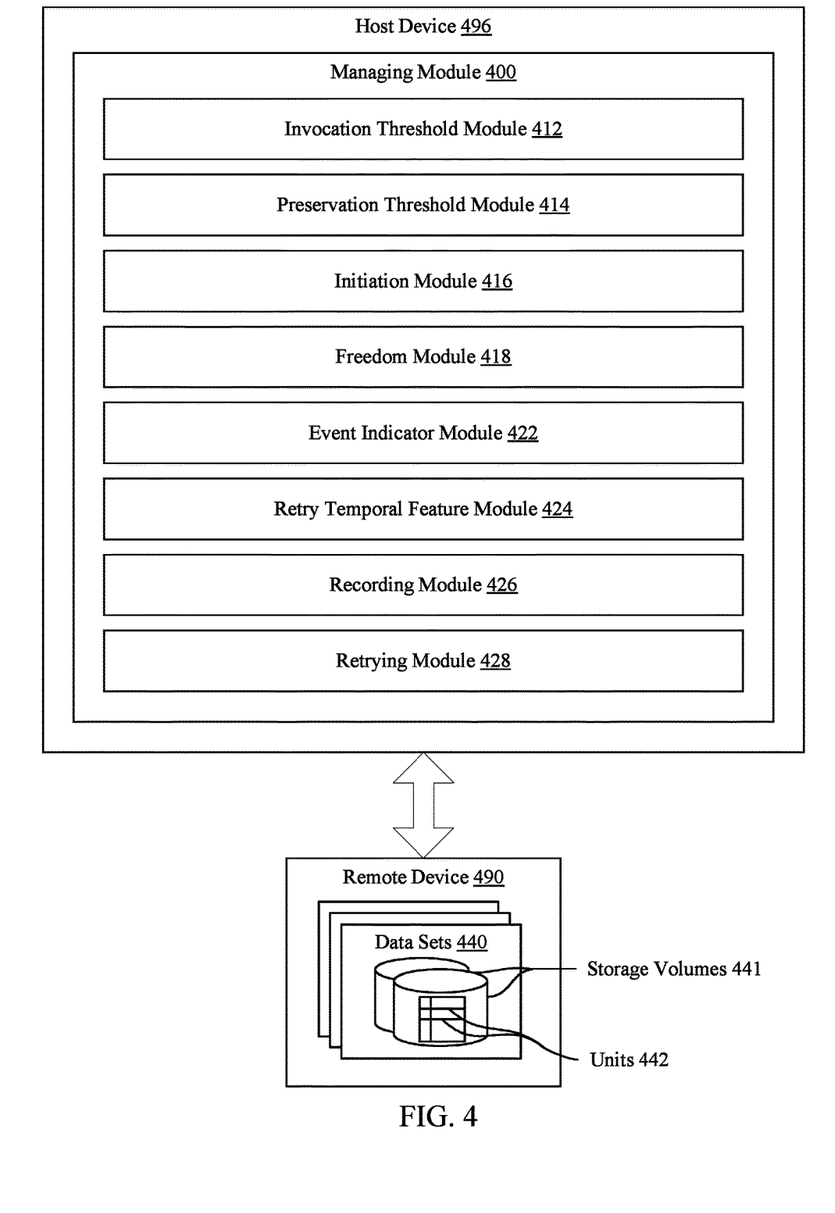
FIG. 4 shows modules of a system for managing a storage facility according to embodiments.

FIG. 4 shows modules of a system for managing a storage facility according to embodiments. In embodiments, method 300 may be implemented using one or more modules of FIG. 4. These modules may be implemented in hardware, software or firmware executable on hardware, or a combination thereof. For example, module functionality that may occur in a host device 496 may actually be implemented in a remote device 490 and vice versa. Other functionality may be distributed across the host device 496 and the remote device 490.

The host device 496 may include a managing module 400. The managing module 400 may be configured and arranged to manage a storage facility. The managing module 400 may include an invocation threshold module 412, a preservation threshold module 414, an initiation module 416, a freedom module 418, an event indicator module 422, a retry temporal feature module 424, a recording module 426, and a retrying module 428. The remote device 490 may have data sets 440 comprising storage volumes 441 having units 442.

The invocation threshold module 412 establishes an invocation threshold for initiating a partial release for a unit of storage space. The invocation threshold can include a numerical value that represents an unused space measurement of a data set which is configured to invoke the partial release. The invocation threshold may indicate when to start a partial release function/operation.

The preservation threshold module 414 establishes a preservation threshold for releasing a fractional amount of the unit of storage space. The preservation threshold may include a numerical value that represents an unused space measurement of a data set which is configured to remain after completely executing the partial release (e.g., indicate how much unused space is leftover afterward). The fractional amount can include a numerical value that represents an unused space measurement of a data set which is configured to be removed in completely executing the partial release (e.g., indicate how much unused space is released by the partial release function/operation). In embodiments, addition of the preservation threshold with the fractional amount is equivalent to a total unused space measurement of a data set.

The initiation module 416 initiates, in response to reaching the invocation threshold, the partial release. In embodiments, in response to closing a data set, a count of closures of the data set may be added to (e.g., adding one). In response to reaching a threshold count of closures of the data set, the partial release can be initiated. In embodiments, a partial release event indicator is established using the event indicator module 422. The partial release event indicator can be configured to indicate reasons for events corresponding to initiated partial releases (e.g., a failed partial release event). The partial release event indicator may be recorded in a record using the recording module 426. The record can be configured to collect reasons for events corresponding to initiated partial releases.

In embodiments, a failed partial release for a data set may be detected. In response to detecting the failed partial release, information for the data set can be collected in a data space. According to particular embodiments, the recording may occur in response to both closing a data set for output and a failed partial release. The partial release event indicator can include a name for the data set or a failure reason code configured to identify at least one reason for the failed partial release.

The freedom module 418 releases, in response to initiating the partial release, the fractional amount (based on the preservation threshold). In embodiments, a partial release retry temporal feature is established using the retry temporal feature module 424. The partial release retry temporal feature can be configured to retry the partial release at one of a predetermined interval or a specified time. Based on the partial release retry temporal feature, the partial release may be retried using the retrying module 428.

Aspects of managing module 400 may provide performance or efficiency benefits when managing unused space. Aspects of the disclosure relate to data storage which provides partial release of unused space. An algorithm is described that can add a threshold to limit the use of the partial release. The algorithm can add a limit to hold a percentage reserve of the unused space from being released. In embodiments, the algorithm may add a retry at intervals for failed partial releases. Altogether, a storage facility may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer program product comprising a computer readable storage medium having a computer readable program stored therein, wherein the computer readable program, when executed on a first computing device, causes the first computing device to perform a method comprising:

monitoring a data set for unused space;

determining the data set includes unused space;

establishing an invocation threshold for initiating a partial release for a unit of storage space, wherein the invocation threshold includes a numeric value that represents an unused space measurement of the data set;

establishing a preservation threshold for releasing a fractional amount of the unit of storage space, wherein the fractional amount includes a fractional numeric value that represents a second unused space measurement of the data set, wherein the second unused space measurement of the data set is an amount of space that is to be removed in a complete execution of the partial release, wherein the preservation threshold includes a numeric value that represents a third unused space measurement of the data set, wherein the third unused space measurement of the data set is an amount of space that is to remain after a complete execution of the partial release, and wherein the preservation threshold added to the fractional amount is equivalent to the unused space measurement of the data set;

initiating, in response to reaching the invocation threshold and for at least a portion of the unused space, the partial release;

releasing, in response to initiating the partial release, the fractional amount based on the preservation threshold, wherein the fractional amount is the at least a portion of the unused space;

establishing a partial release event indicator configured to indicate reasons for events corresponding to the initiated partial release;

detecting the initiated partial release was a failure;

recording the partial release event indicator in a record configured to collect reasons for events corresponding to the initiated partial release, wherein the record includes a name of the data set and a failure reason code, wherein the failure reason code is configured to identify the reason for the initiated partial release was a failure;

establishing a partial release retry temporal feature configured to retry the partial release at a predetermined interval; and retrying, based on the partial release retry temporal feature, the partial release.

* * * * *